(12) United States Patent
Huang

(10) Patent No.: US 7,278,434 B2
(45) Date of Patent: Oct. 9, 2007

(54) CLEANING DEVICE WITH TOGGLE FOR INCREASING OZONE DISSOLUTION IN WATER FOR CLEANING VEGETABLES AND FRUITS

(76) Inventor: Shu Fen Huang, 235 Chung- Ho Box 8-24, Taipei (TW)

( * ) Notice: Subject to any disclaimer, the term of this patent is extended or adjusted under 35 U.S.C. 154(b) by 109 days.

(21) Appl. No.: 10/981,610

(22) Filed: Nov. 5, 2004

(65) Prior Publication Data

US 2006/0096623 A1    May 11, 2006

(51) Int. Cl.
    *B08B 3/04*    (2006.01)
(52) U.S. Cl. .............. 134/99.1; 134/100.1; 134/102.1; 261/122.1
(58) Field of Classification Search .............. 134/94.1, 134/99.1, 100.1, 102.1; 261/122, 122.1
    See application file for complete search history.

(56) References Cited

U.S. PATENT DOCUMENTS

| | | | | |
|---|---|---|---|---|
| 3,970,731 A | * | 7/1976 | Oksman | 261/122.1 |
| 4,569,805 A | * | 2/1986 | Hume et al. | 261/122.1 |
| 4,639,314 A | * | 1/1987 | Tyer | 210/220 |
| 5,113,881 A | * | 5/1992 | Lin et al. | 134/1 |
| 5,227,184 A | * | 7/1993 | Hurst | 426/312 |
| 5,376,311 A | * | 12/1994 | DeGuzman | 261/77 |
| 5,501,241 A | * | 3/1996 | Jacobson | 134/95.2 |
| 5,720,905 A | * | 2/1998 | Ho | 261/16 |
| 5,927,304 A | * | 7/1999 | Wen | 134/153 |
| 6,094,948 A | * | 8/2000 | Hong et al. | 68/183 |
| 6,640,818 B1 | * | 11/2003 | Talisman | 134/89 |
| 2004/0007258 A1 | * | 1/2004 | Lasker et al. | 134/155 |

FOREIGN PATENT DOCUMENTS

| | | | |
|---|---|---|---|
| JP | 56-106581 | * | 8/1981 |
| JP | 57-156021 | * | 9/1982 |
| JP | 60-99387 | * | 6/1985 |
| JP | 64-85655 | * | 3/1989 |
| JP | 1-225441 | * | 9/1989 |
| JP | 2-234659 | * | 9/1990 |
| JP | 3-297372 | * | 12/1991 |
| JP | 7-236461 | * | 9/1995 |
| JP | 9-108158 | * | 4/1997 |
| JP | 2003-121593 | * | 4/2003 |

OTHER PUBLICATIONS

WIPO 99/35945 Jul. 1999.*

* cited by examiner

*Primary Examiner*—Frankie L. Stinson

(57) ABSTRACT

A cleaning device with a toggle serves for increasing ozone dissolution in water for cleaning vegetables and fruits. The cleaning device is placed in a washing barrel. The cleaning device comprises a toggle being a circular body which is installed with at least one water circulation hole; and an air-stone disk formed by a bottom disk and a plurality of air stones; a lateral side of the bottom disk being connected to an air inlet tube for inputting air into the air-stone disk for diffusing airs. An upper periphery of the bottom disk is installed with a combining recess for combing the toggle. The washing barrel is a hollow barrel for receiving washing barrel therein; and a top of the washing barrel is installed with a cover.

1 Claim, 5 Drawing Sheets

CLEANING DEVICE WITH TOGGLE FOR INCREASING OZONE DISSOLUTION IN WATER FOR CLEANING VEGETABLES AND FRUITS

FIELD OF THE INVENTION

The present invention relates to cleaning devices, and particularly to a cleaning device with a toggle for increasing ozone dissolution in water for cleaning vegetables and fruits, wherein by installing a toggle upon an air-stone disk containing a plurality of air stones, the ozone can uniformly distribute in water so as to increase the effect of cleaning and sterilization ability of the ozone solution.

BACKGROUND OF THE INVENTION

To dissolve ozone into water has the effect of sterilization for vegetables, fruits, fishes, meats, etc. Thereby the ozone solution is advantageous in cleaning and sterilization. This is because the ozone is decomposed in water rapidly so as to have a strong oxidization effect.

In the prior art, air stones are placed in a barrel for diffusing ozone in the water. However it is not affective for dissolving ozone since the ozone cannot uniform diffuse in water. Thereby the current technology confines the effect of the ozone solution.

SUMMARY OF THE INVENTION

Accordingly, the primary object of the present invention is to provide a cleaning device with a toggle for increasing ozone dissolution in water for cleaning vegetables and fruits, wherein by installing a toggle upon an air-stone disk containing a plurality of air stones, the ozone can uniformly distribute in water so as to increase the effect of cleaning and sterilization ability of the ozone solution.

To achieve above object, the present invention provide a cleaning device with a toggle which serves for increasing ozone dissolution in water for cleaning vegetables and fruits; the cleaning device being placed in a washing barrel. The cleaning device comprises a toggle being a circular body which is installed with at least one water circulation hole; and an air-stone disk formed by a bottom disk and a plurality of air stones; a lateral side of the bottom disk being connected to an air inlet tube for inputting air into the air-stone disk for diffusing airs. An upper periphery of the bottom disk being installed with a combining recess for combing the toggle. The washing barrel is a hollow barrel for receiving washing barrel therein; and a top of the washing barrel is installed with a cover.

The various objects and advantages of the present invention will be more readily understood from the following detailed description when read in conjunction with the appended drawing.

DESCRIPTION OF THE PREFERRED EMBODIMENT

In order that those skilled in the art can further understand the present invention, a description will be described in the following in details. However, these descriptions and the appended drawings are only used to cause those skilled in the art to understand the present invention, but not used to confine the scope of the present invention. The scope of the present invention is defined in the claims.

Figure 1:
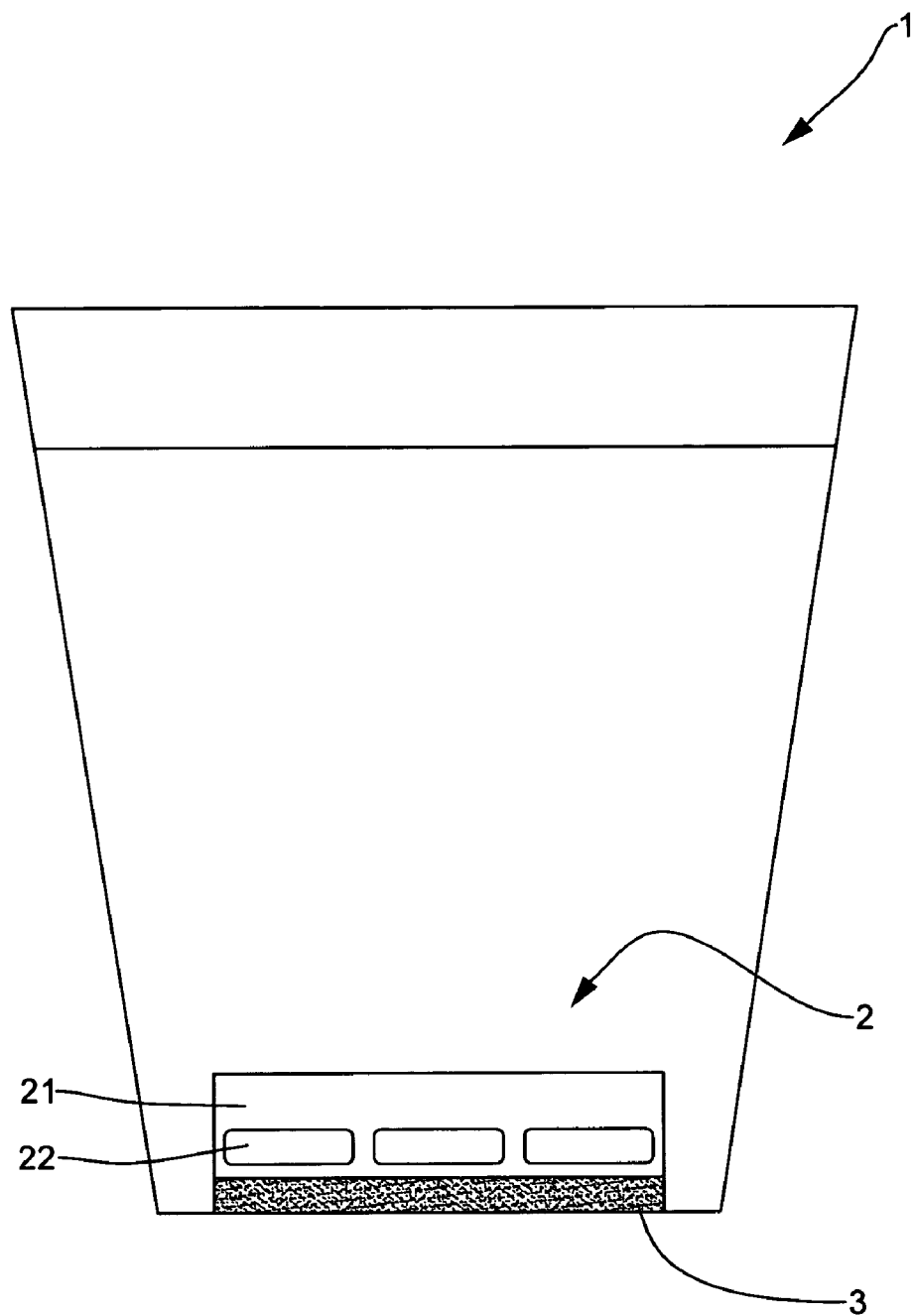
FIG. 1 is a schematic view about the structure of the washing barrel of the present invention.
Figure 2:
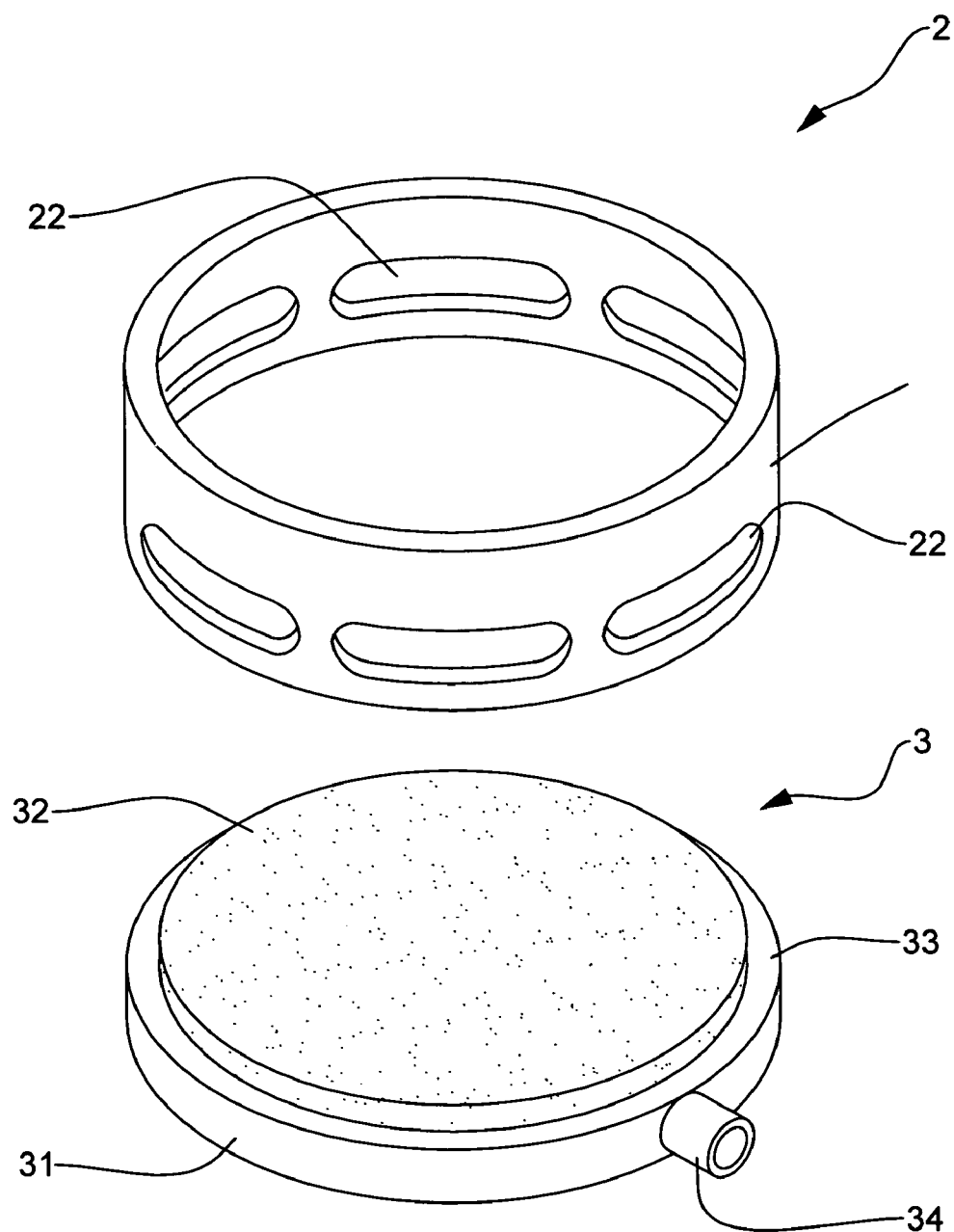
FIG. 2 is an exploded perspective view of the toggle and air-stone disk of the present invention.

Referring to FIGS. 1 and 2, the structure of the present invention is illustrated. The present invention has the following elements.

A washing barrel 1 is a hollow barrel for receiving washing barrel therein. A top of the washing barrel 1 is installed with a cover.

A toggle 2 is a circular body 21 which is installed with at least one water circulation hole 22.

An air-stone disk 3 is formed by a bottom disk 31 and one air stone 32. A lateral side of the bottom disk 31 is connected to an air inlet tube 34 for inputting air into the air-stone disk 3 for diffusing airs. Thereby an upper periphery of the bottom disk 31 is installed with a combining recess 33 for combing the toggle 2.

Figure 3:
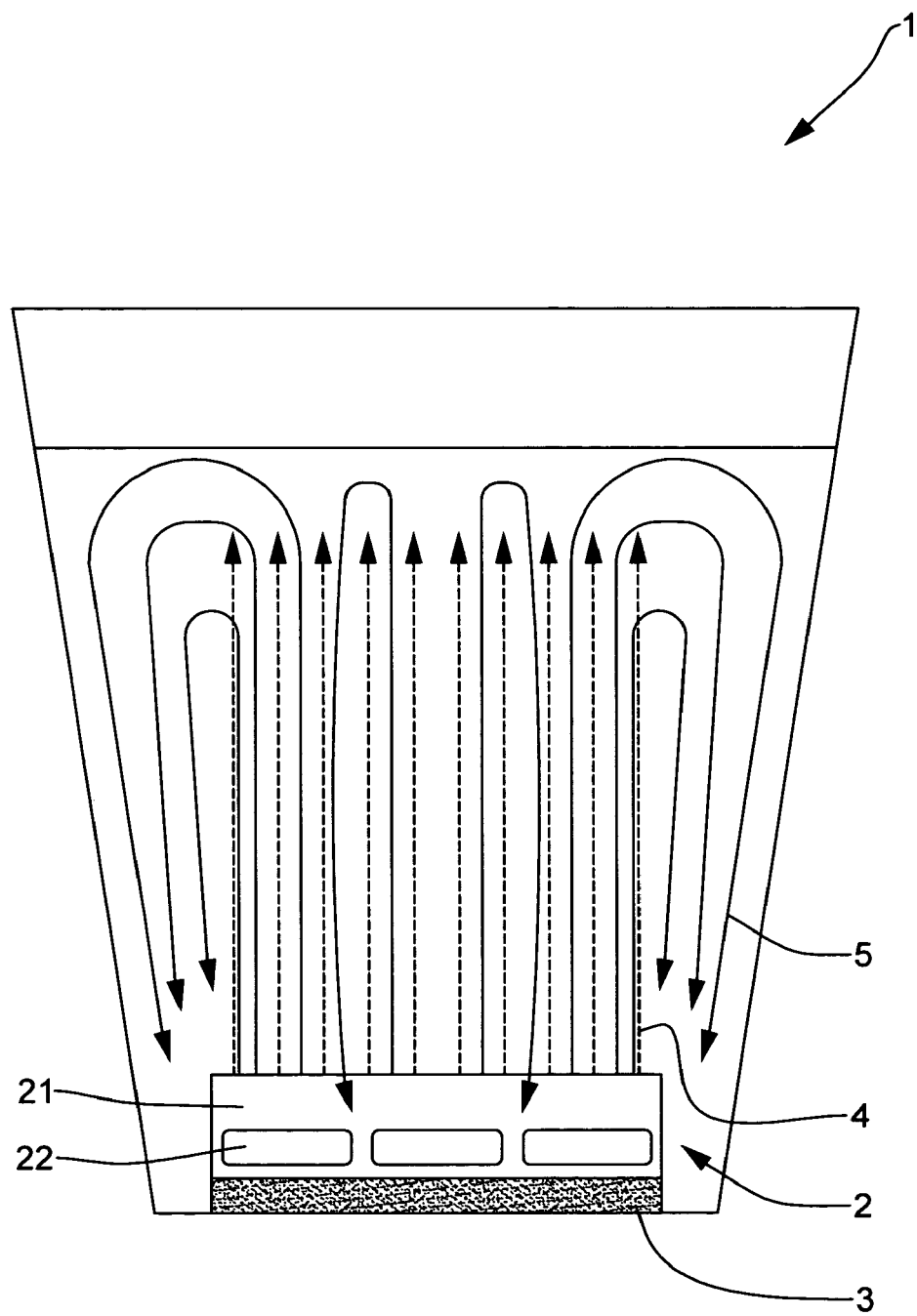
FIG. 3 is a schematic view showing the airflow and water flow in the washing barrel according to the present invention.

In assembly, the toggle 2 and the air-stone disk 3 are assembled into a bottom of the washing barrel 1. Water is filled into the washing barrel 1 and ozone is inputted to the air inlet tube 34 so as to form special airflow 4 and water flow 5 as illustrated in FIG. 3. In the present invention, the water circulation holes 22 serve to improve the water flow. When ozone diffuse from the air-stone disk 3, the density in the center of the washing barrel 1 is low and the periphery near the wall of the barrel 1 is high so that water flows upwards and then toward the wall of the barrel. Then, water can flow through the water circulation holes 22 so as to flow circularly. Thereby air bubble distributes uniformly.

The toggle 2 and air-stone disk 3 can be made separately or integrally.

If no toggle 2 is installed in the washing barrel 1 and upon the air-stone disk 3, the water circulation is not preferred so that the distribution of bubbles is not uniform and can not diffused. Thus, the dissolution of the ozone is not preferred.

Figure 4:
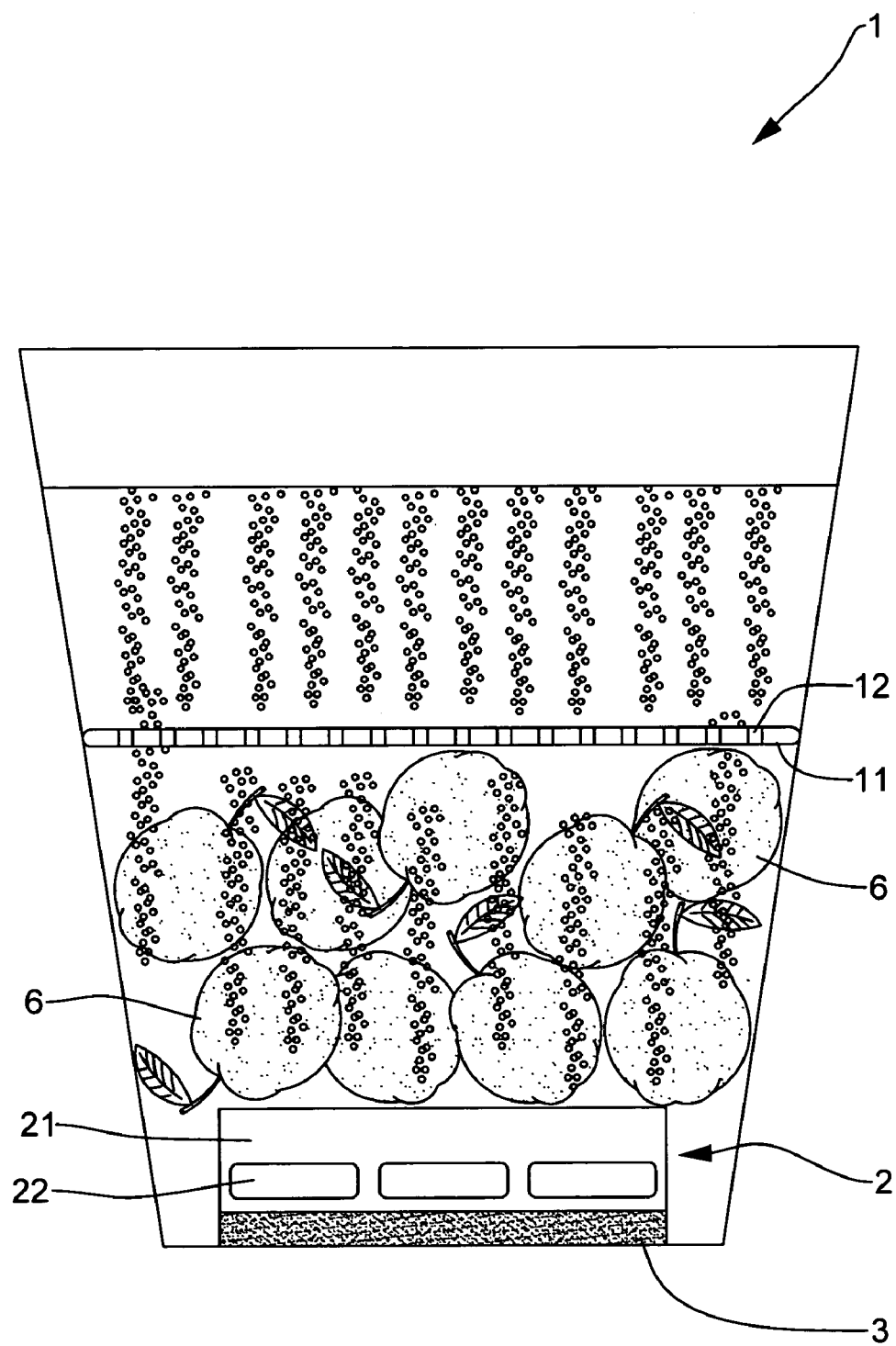
FIG. 4 shows one application of the present invention.

FIG. 4 shows the application of the present invention. The vegetables and fruits 6 are placed into the washing barrel 1. Ozone is inputted from the air inlet tube 34 and diffuses from the air-stone disk 3 so as to dissolve in the water for cleaning and sterilizing the vegetables and fruits 6. In use, a press plate 11 with through holes 12 are used.

Figure 5:
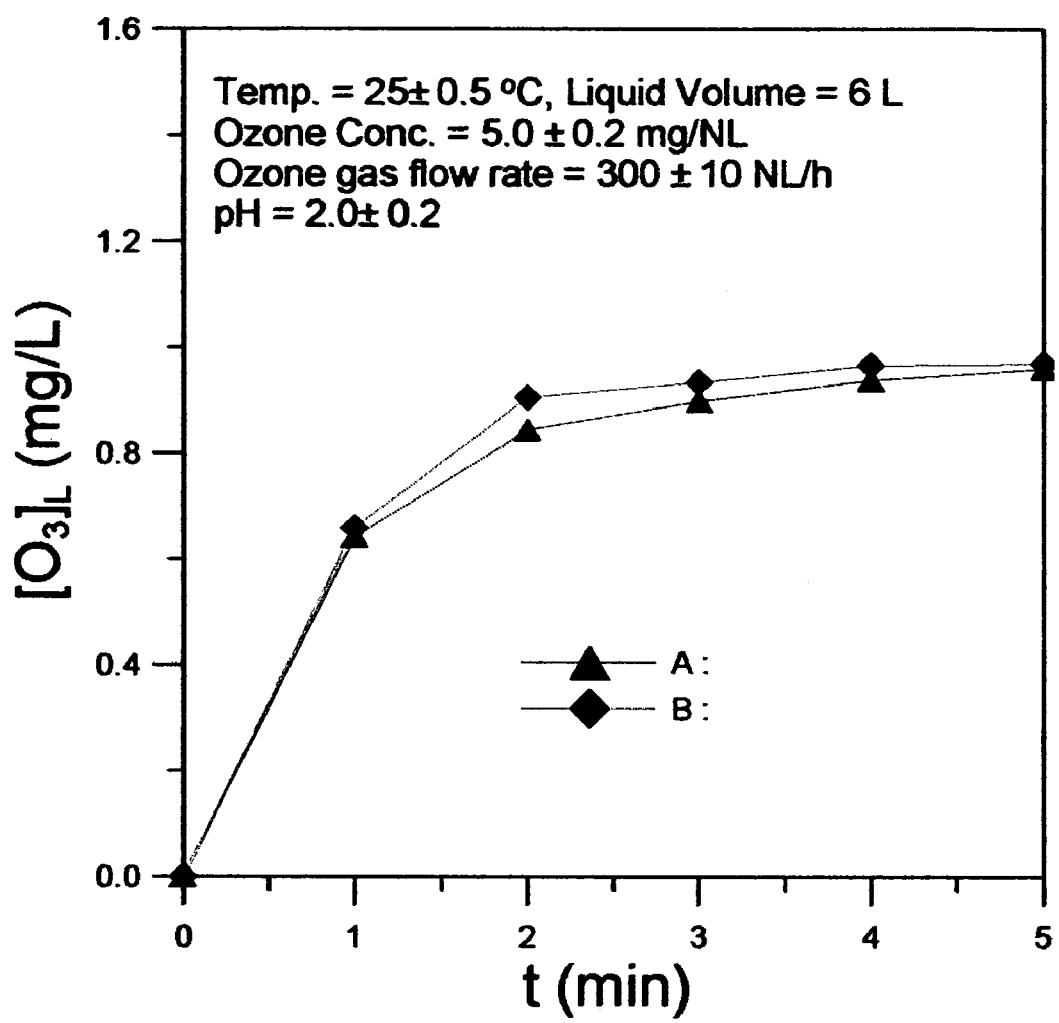
FIG. 5 shows the curves of experiment about the present invention.

Referring to FIG. 5, in that, the curve A (triangles) represents the dissolution of the ozone as only air-stone disk 3 is installed in the washing barrel 1 without any toggle 2. The curve B (rhombus) shows the condition that the air-stone disk 3 and toggle 2 are placed in the washing barrel 1. It is apparent that the curve B has a preferred effect.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A cleaning device with a toggle for cleaning vegetables and fruits; the cleaning device comprising:

a washing barrel;

a toggle being a circular ring which is formed with at least one water circulation hole; and an air-stone disk formed by a bottom disk and one air stone; a lateral side of the bottom disk being connected to an air inlet tube for inputting air into the air-stone disk for diffusing airs; thereby an upper periphery of the bottom disk being installed with a combining recess for combing the toggle, after assembly, an upper edge of the ring is higher than an upper side of the air-stone disk;

wherein the washing barrel is a hollow barrel; and a top of the washing barrel is installed with a cover;

wherein a press plate is installed in the vegetable washing barrel; and the press plate has through holes, and the plate flat is a flat sheet; and wherein the toggle and air-stone disk are integrally formed.

* * * * *